No. 637,214. Patented Nov. 14, 1899.
R. H. PANGBORN.
ADJUSTABLE GAGE FOR CUT-OFF SAWS.
(Application filed Apr. 14, 1898.)
(No Model.)
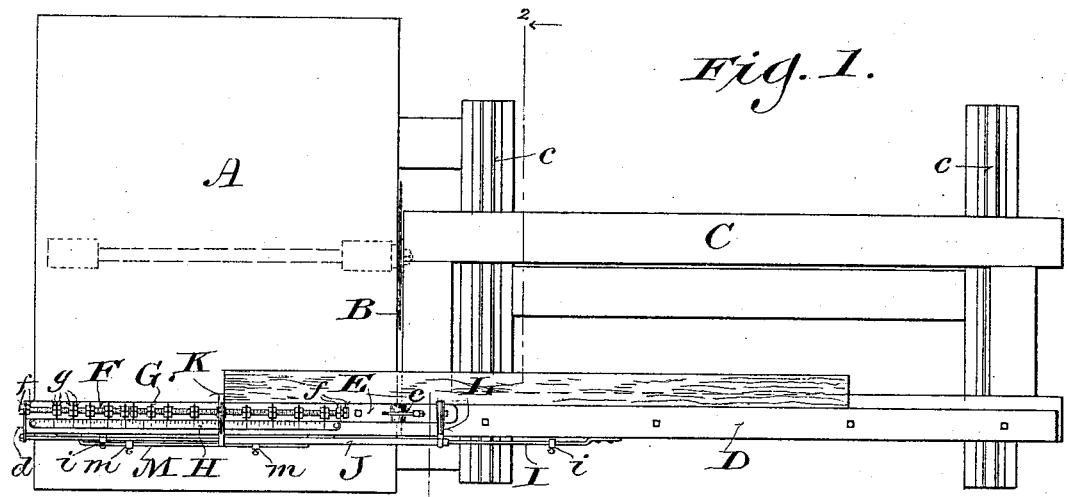
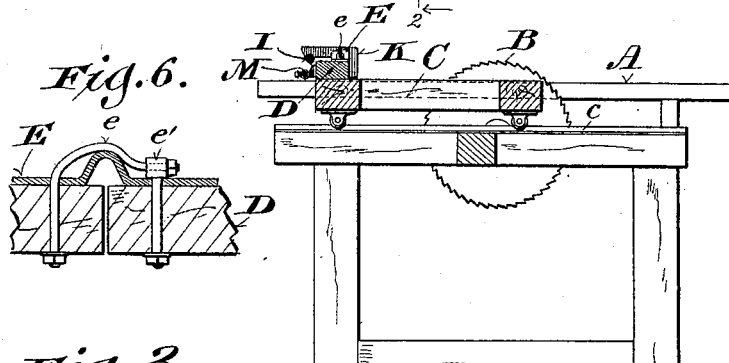
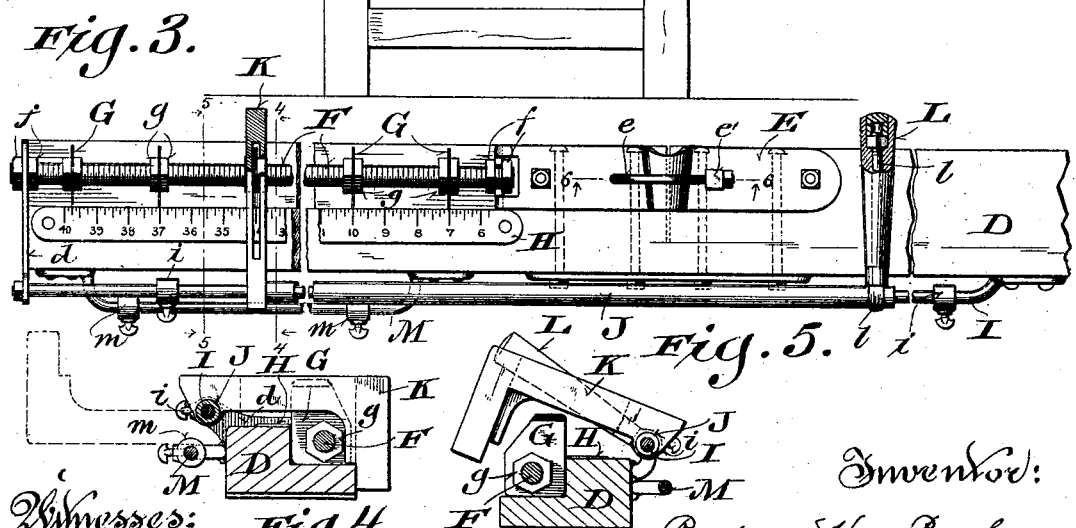

UNITED STATES PATENT OFFICE.

REDMOND HENRY PANGBORN, OF MENOMINEE, MICHIGAN, ASSIGNOR OF ONE-HALF TO WILLIAM P. POWELL, OF SAME PLACE.

ADJUSTABLE GAGE FOR CUT-OFF SAWS.

SPECIFICATION forming part of Letters Patent No. 637,214, dated November 14, 1899.

Application filed April 14, 1898. Serial No. 677,562. (No model.)

*To all whom it may concern:*

Be it known that I, REDMOND HENRY PANGBORN, a citizen of the United States, residing at Menominee, in the county of Menominee and State of Michigan, have invented certain new and useful Improvements in Adjustable Gages for Cut-Off Saws, of which the following is a specification, reference being had to the accompanying drawings, forming a part thereof.

The main objects of my invention are to facilitate cutting or trimming lumber exactly to any desired length or to different lengths, to save time, to avoid unnecessary handling, and to prevent mistakes and waste of material.

It consists of certain novel features in the construction and arrangement of component parts of the device, as hereinafter particularly described, and pointed out in the claims.

In the accompanying drawings like letters designate the same parts in the several figures.

Figure 1 is a plan view of a cut-off machine, showing my improved gage applied thereto. Fig. 2 is a vertical section of the same on the line 2 2, Fig. 1. Fig. 3 is a plan view, on an enlarged scale, of the gage. Figs. 4 and 5 are cross-sections on the lines 4 4 and 5 5, Fig. 3; and Fig. 6 is a vertical longitudinal section on the line 6 6, Fig. 3.

For the purpose of illustration I have shown the gage applied to a cut-off machine having a stationary saw and a carriage for supporting the lumber to be trimmed or cut to length and moving it in proper position to and from the saw; but the device is equally applicable to machines in which the saw moves forward and back and the lumber is stationarily held upon the saw-table. In the former case, as shown in the drawings, the gage is attached to the front rail of the carriage, and in the latter case it is attached to the saw table or frame.

Referring to Figs. 1 and 2, A designates the saw-table, B the saw, and C the carriage, of a machine belonging to the class first mentioned. The carriage C is adapted to travel forward and back upon ways $c\ c$, parallel with the saw-plane.

D is the gage-rail, against which the stuff to be trimmed or cut to length is placed and held. It is usually made of wood and is arranged at right angles to the plane of the saw. With a machine having a stationary saw and a carriage it is attached to the front rail of the carriage, as shown in the drawings, one end projecting over the saw-table. Opposite the saw the rail is partially severed by a transverse cut, which is spanned by a metal bridge-piece E, bolted to the upper side of the rail on each side of said cut. When the gage is applied to a carriage, as shown in the drawings, a truss-rod $e$, secured at one end in the rail on one side of said cut, passing over the arch of the bridge-piece and adjustably secured by a nut in an eyebolt or post $e'$, secured in said rail on the other side of the cut, as shown in Fig. 6, is provided. By this means the end of the rail overhanging the saw-table is prevented from sagging and may be raised or lowered by tightening or loosening the nut on the rod $e$.

F is a screw-threaded rod attached at its ends to the upper side of the rail D over the saw-table. It is provided with a number of teeth G, consisting of perforated metal plates strung upon said rod and adjustably held thereon perpendicular thereto by nuts $g$, each plate or tooth being firmly clamped between a pair of nuts. The rail D is cut away below the rod F, as shown in Figs. 4 and 5, thus forming a rabbet or angular recess in which the squared bases or lower edges of the teeth G are held and guided. One end of the rod F is adjustably secured by a pair of nuts $f$ in the downturned end of the bridge-piece E, while the other end is secured in like manner in a plate $d$, attached to the end of the rail D. By means of these nuts $f$ the several teeth G may be simultaneously adjusted lengthwise of the rail D.

H is a scale attached to the top of the rail D parallel with the rod F, so as to indicate the distances of the several teeth from each other and from the saw-plane.

I is a rod attached at the ends to the back of the rail D and extending from the end plate $d$, in which it is secured parallel with and a little above the threaded rod F to a point some distance beyond the bridge-piece E.

J is a sleeve loosely mounted upon the rod

I and provided at one end with an L-shaped stop K, which is rigidly secured thereon and is adapted to be turned forward over the rail D, as shown in Fig. 4, into position to engage with the end of a piece of lumber held against the front side of said rail and moved endwise along the same over the saw-table so as to determine the length to be cut. The longer or horizontally-disposed limb of the stop is slotted, as shown in Fig. 3, to pass over and engage with any one of the several teeth G, which are sharpened on their upper edges to facilitate the engagement of the stop therewith. The sleeve J is provided with a handle L for operating said stop. This handle is adjustably attached to said sleeve, so that it can be readily shifted endwise thereof and set at any desired point thereon most convenient for the operator. Any suitable fastening for adjustably holding the handle on the sleeve may be employed. I have shown for the purpose a rod $l$, which is threaded at one end in a nut in the handle L and is formed at the other end with a collar loosely fitted upon the sleeve J. By turning the handle L the eye of the screw-rod is loosened or tightened and the handle is released or secured upon said sleeve J.

To facilitate the operation of the stop K and its engagement with either of any two of the teeth G, the rod I is provided with adjustable collars $i\ i$, which may be set to limit the endwise movement of the sleeve J thereon in either or both directions.

M is a rod attached to the back of the rail D below and parallel with the rod I. It is provided with two or more adjustable collars $m\ m$, adapted to engage with the heel of the stop K when it is turned backward farther than is necessary to disengage it from the teeth G and limit its movement opposite any intermediate tooth between those opposite which the collars $i\ i$ are set. The collars $i$ and $m$ may thus be adjusted to aid in setting the stop K for cutting lumber to several different lengths without loss of time, whereby the material may be worked up to the best advantage without waste or rehandling. The several teeth G may be set on the rod F at equal distances from each other or at different distances, as desired for any particular kind or variety of work. When set as desired with relation to each other, they may be adjusted together toward and from the saw-plane by means of the nuts $f$. The collars $i$ and $m$ may part or all be adjusted on the rods I and M to facilitate the engagement of the stop K with any of the teeth G for cutting any special lengths.

My improved gage will be found particularly convenient and advantageous in cutting box-stuff, as it will enable the operator to cut various lengths one after another in any order from the same piece of lumber without loss of time and without waste of material.

Various changes in minor details of construction may be made without affecting the operation of the gage and without departure from the principle and intended scope of my invention.

I claim—

1. In a gage for cut-off saws, the combination of a threaded rod arranged tranversely to the saw-plane, nuts threaded on said rod, a tooth adjustably held thereon between said nuts and an adjustable stop adapted to be engaged with and held in adjusted position by said tooth, substantially as and for the purposes set forth.

2. In a gage for cut-off saws the combination of two parallel rods arranged transversely to the saw-plane, teeth adjustably mounted on one of said rods, and a stop pivotally mounted upon the other rod and adapted to be moved lengthwise thereof into position to engage any one of said teeth, substantially as and for the purposes set forth.

3. In a gage for cut-off saws the combination of a series of teeth arranged transversely to the saw-plane, and a pivoted stop movable parallel with said series of teeth into position to engage any one of them, substantially as and for the purposes set forth.

4. In a gage for cut-off saws the combination of a series of teeth and a rod arranged parallel with each other and transversely to the saw-plane, a sleeve adapted to be turned and moved endwise on said rod, a stop fixed upon said sleeve and adapted to be engaged with any one of said teeth, and a handle adjustably mounted on said sleeve for operating said stop, substantially as and for the purposes set forth.

5. In a gage for cut-off saws the combination of a series of normally stationary adjustable teeth, a scale indicating the distances of said teeth from the saw-plane, and a movable stop adapted to be engaged with any one of said teeth and to determine the length of lumber to be cut, substantially as and for the purposes set forth.

6. In a gage for cut-off saws the combination with a series of teeth, a rod parallel therewith, a stop for determining the length of lumber to be cut, movable endwise and adapted to turn on said rod into and out of engagement with any desired tooth, and collars adjustably mounted on said rod for limiting the movement of said stop endwise thereof, substantially as and for the purposes set forth.

7. In a gage for cut-off saws, the combination of a series of teeth, a rod parallel therewith, a stop movable endwise thereof and adapted to be turned into engagement with any one of said teeth, collars adjustable endwise upon said rod to limit the movement of said stop for the maximum and minimum lengths to be sawed, and another rod parallel with the stop-rod and provided with adjustable collars for setting the stop to cut intermediate lengths, substantially as and for the purposes set forth.

8. In a gage for cut-off saws the combination with the gage-rail having a transverse cut to receive the saw of a bridge-piece spanning said cut, and a truss-rod secured to the rail on one side of said cut, passing over said bridge-piece and held by a nut threaded thereon in an eyebolt or post secured to the rail on the other side of said cut, substantially as and for the purposes set forth.

9. In a gage for cut-off saws the combination with a rail having a series of teeth and a rod arranged parallel with the rail, of an L-shaped stop adapted to be moved endwise and to be turned on said rod and having a slot or opening adapted to receive any one of said teeth when the stop is turned over the same, substantially as and for the purposes set forth.

10. In a gage for cut-off saws the combination with a rail having a series of teeth and two rods arranged parallel with said rail one above the other, of an L-shaped stop adapted to be moved lengthwise and turned upon the upper rod into and out of engagement with any one of said teeth, adjustable collars on the upper rod for setting said stop to cut maximum and minimum lengths, and adjustable collars on the lower rod arranged to be engaged by said stop when it is turned farther backward for setting it to cut intermediate lengths, substantially as and for the purposes set forth.

In witness whereof I hereto affix my signature in presence of two witnesses.

REDMOND HENRY PANGBORN.

Witnesses:
G. P. EISMAN,
WM. P. POWELL.